United States Patent [19]

Fishburne

[11] Patent Number: 4,618,170

[45] Date of Patent: Oct. 21, 1986

[54] COUPLED PIPES AND SEALED UNIONS THEREFOR

[76] Inventor: Francis B. Fishburne, 174 Weston Rd., Arden, N.C. 28704

[21] Appl. No.: 801,943

[22] Filed: Nov. 26, 1985

[51] Int. Cl.[4] .................... F16J 15/00; F16L 27/00
[52] U.S. Cl. .................................. 285/90; 285/184; 285/354; 285/332.3
[58] Field of Search ............... 285/90, 184, 347, 353, 285/354, 332.3, 334.4

[56]  References Cited
U.S. PATENT DOCUMENTS

| 115,917 | 6/1871 | Wharton | 285/347 |
| 846,704 | 3/1907 | Stucy | 285/90 |
| 904,673 | 11/1908 | Bideker | 285/354 |
| 1,301,245 | 4/1919 | Fox | 285/354 |
| 1,307,392 | 6/1919 | Codd | 285/354 |
| 2,516,743 | 7/1950 | Allin | 285/347 |
| 2,523,995 | 9/1950 | Parmesan | 285/347 |
| 3,240,513 | 3/1966 | Turzillo | 285/90 |
| 3,792,878 | 2/1974 | Freeman | 285/347 |

FOREIGN PATENT DOCUMENTS

| 1098480 | 7/1955 | France | 285/347 |
| 661137 | 11/1951 | United Kingdom | 285/184 |

Primary Examiner—Cornelius J. Husar
Assistant Examiner—Anthony Knight
Attorney, Agent, or Firm—Roylance, Abrams, Berdo & Goodman

[57]  ABSTRACT

Misaligned pipes for handling fluids under high pressure are coupled by a sealed union which, despite the angular displacement of the pipes, remains sealed during the heavy shocks which occur during high pressure service. The coupling employs a conventional annular seal, typically an O-ring, and can be made up without applying a significant bending stess to either pipe.

3 Claims, 5 Drawing Figures

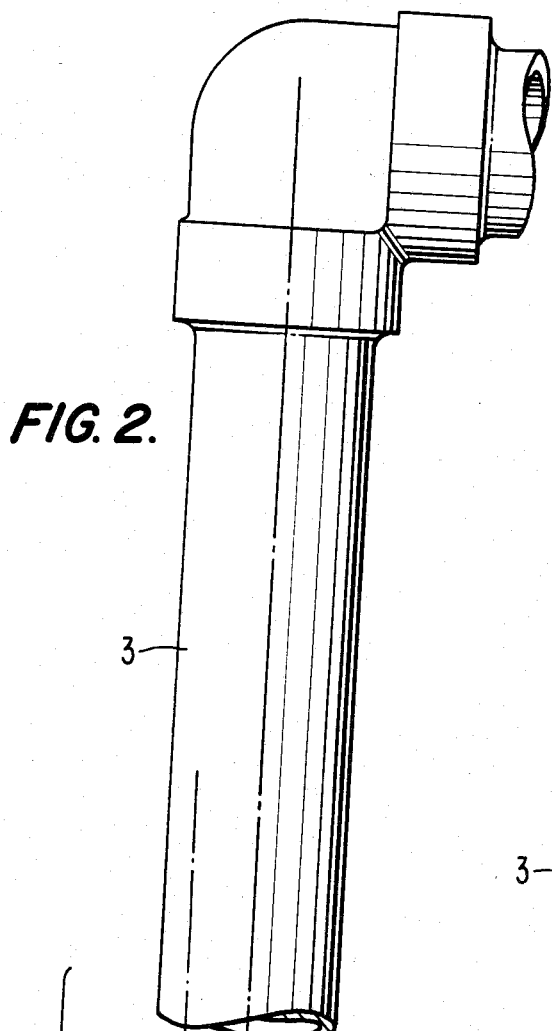
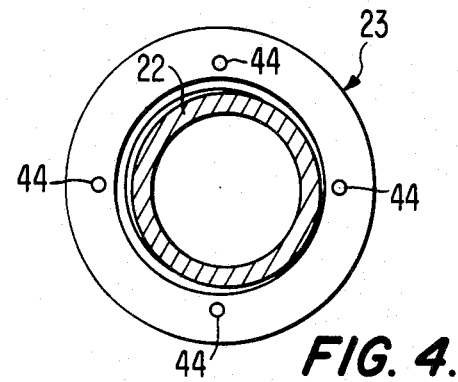
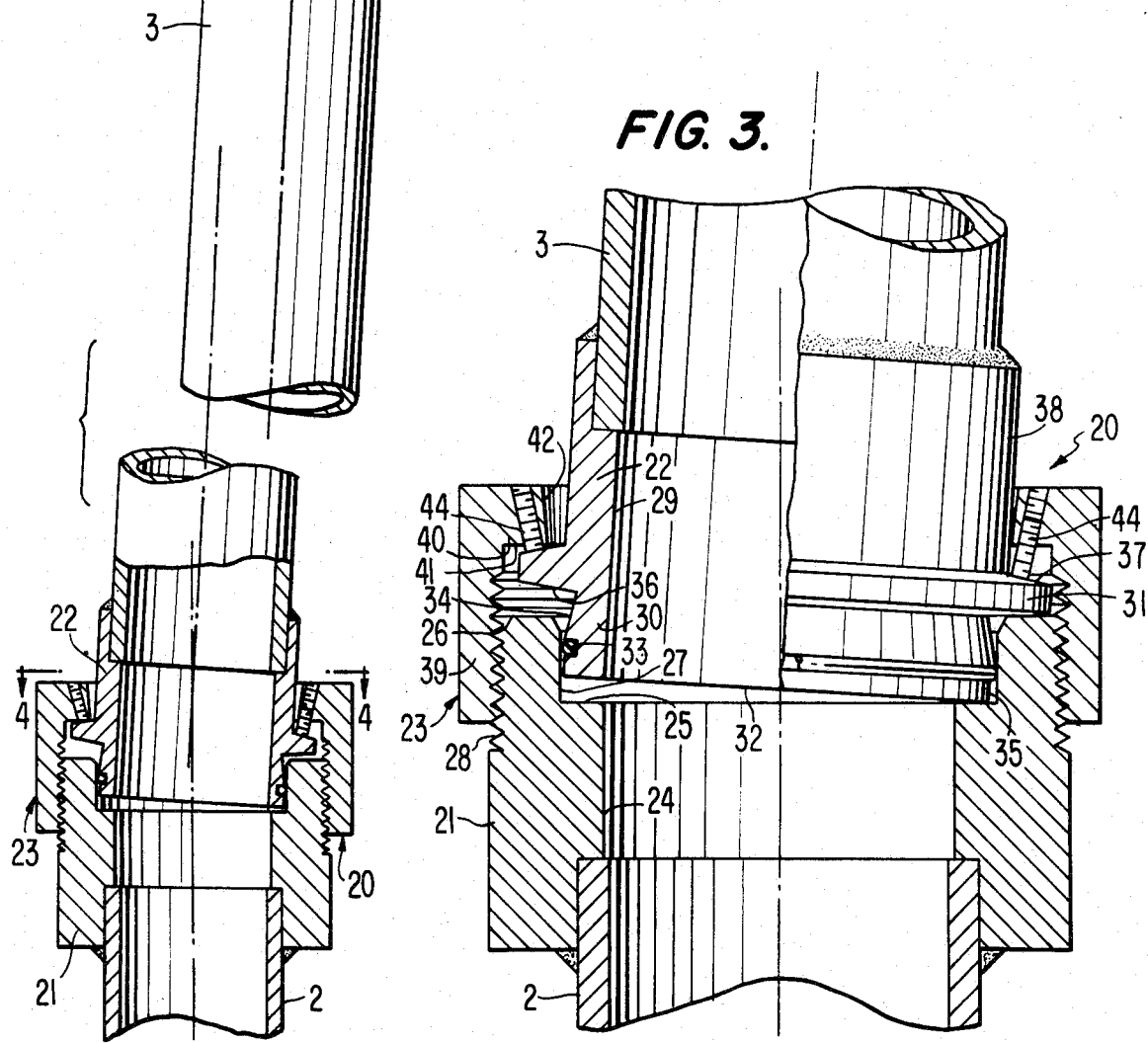

COUPLED PIPES AND SEALED UNIONS THEREFOR

The invention relates to coupled pipes for handling fluid under substantial pressure and to sealed unions for connecting pipes and maintaining a sealed condition for prolonged periods of use despite angular displacement of one pipe relative to the pipe or other device to which it is coupled.

BACKGROUND OF THE INVENTION

In the art of coupling pipes, much attention has necessarily been given to the problem of obtaining a fluid-tight seal so that there will be no leakage at the connection. When the pipes are to carry, e.g., water at a relatively low pressure, prior-art workers have provided successful connectors which employ O-rings or like sealing rings and which will tolerate a relatively small angular misalignment between the two pipes, or between one length of pipe and a device such as a tank. But, when the connection is intended to conduct, e.g., hydraulic pressure fluid at relatively high pressures of, e.g., up to 2000 p.s.i., such relatively simple couplings have not heretofore achieved real success and it has become common practice to use expensive ground joint couplings or unions which, despite their high cost, have frequently proved undependable when the pipes being coupled are angularly misaligned and the system is subjected to prolonged service. Thus, for many applications where fluid under relatively high pressure must be handled, and particularly for the pressure fluid systems of presses used to press tobacco, textile materials and the like, there has been a continuing need for an improved approach to coupling pipes which will be more dependable and less expensive than when the pipes are coupled with a ground joint union.

SUMMARY OF THE INVENTION

The invention is based in part upon discovery of the reason for failure of prior-art unions, such as the ground joint unions, when used to couple pipes for handling high pressure fluid when one of the pipes being coupled is misaligned relative to the other. As will be described hereinafter in detail with reference to the accompanying drawings, the conventional ground joint union comprises a female member having a concave spherical sealing surface, a male member having a matching convex spherical sealing surface, and a threaded ring or nut member for making up the connection so that the two spherical sealing surfaces are forced together in flush engagement. With the male and female members each rigidly secured to a different one of the pipes to be coupled, any significant misalignment between that two pipes causes the two spherical sealing surfaces to be rotationally displaced and a good sealing relationship does not exist. Thus, the male member can be considered to be tilted relative to the female member, just as the pipe to which the male member is secured is tilted relative to the pipe to which the female member is secured, with the result that one peripheral portion of the convex spherical sealing surface is displaced upwardly from the periphery of the other concave sealing surface to such an extent that the surfaces are not in good sealing engagement. This is initially cured by tightening the nut member, thus forcing the male member, and the end of the pipe to which it is secured, to swing more nearly into alignment with the female member as the two spherical sealing surfaces are brought into better sealing engagement. But such tightening of the nut member places the pipe to which the male member of the union is secured under a substantial bending stress. Thus, if it be considered that one of the pipes has a first end secured to the male member of the union and a second end which is fixed in a position offset from the longitudinal axis of the pipe to which the female member of the union is secured, it will be understood that tightening of the nut member of the union to bring the spherical sealing surfaces into satisfactory sealing engagement places a small but significant S-shaped bend in the pipe to which the male member is secured, and that the bend results from a stress applied to the pipe by tightening of the union, with a substantial portion of the resulting forces being applied to the male member of the union. Upon analysis of the forces involved, it will be seen that it is the stress thus applied to the pipe which maintains the spherical surfaces of the union in sealing engagement against the internal pressure resulting from fluid being handled by the pipes. Were the stress established in the pipe to persist unchanged, the union would continue to remain sealed. However, in the course of normal prolonged service of such piping systems, at least two types of heavy shocks occur which relieve the bending stress in the pipe and cause the union to fail.

The invention overcomes this problem by employing a connector or union which, though employing two connector members each rigidly connected to and coaxial with a different one of the two pipes to be coupled, can be fully made up without applying a significant bending stress to either pipe, even though one pipe is angularly displaced relative to the other, and which will then maintain an adequate seal over a prolonged period of service regardless of whether the pipes are subjected to heavy shocks.

In a particularly advantageous and inexpensive embodiment of the invention, the union comprises a female member having a flow-conducting bore, a transverse annular shoulder at the end of the bore opposite the pipe to which the female member is connected, and an annular sealing surface of larger diameter than and concentric with the bore, the sealing surface extending away from the shoulder and terminating at a transverse annular end face, a portion of the outer surface of the female member being threaded. The union further comprises a male member, which is rigidly connected to the second of the pipes to be connected, and a nut member. The male member has a fluid-conducting bore, a nose portion dimensioned to be received within the space defined by the sealing surface of the female member and having a transverse annular end face capable of engagement with the shoulder of the female member, a transverse annular outwardly projecting flange spaced from the end face of the nose portion by a distance such that the flange will be at least immediately adjacent the end face of the female member when the end face of the nose portion engages the shoulder of the female member, and an annular outer surface portion extending from the flange to the end of the male member opposite the nose portion. The nose portion includes a transverse annular outwardly opening groove and an O-ring or other sealing ring engaged in the groove, the outer surface portion of the nose portion being tapered frustoconically at a predetermined small angles from the groove to the flange with the smaller diameter at the flange and the larger diameter at the groove. The nut member comprises an internally threaded ring portion in threaded engagement with the external threads of the female member, and a transverse annular inwardly projecting flange spaced from the end face of the female member, the flange of the male member extending outwardly into the space between the inwardly projecting flange of the nut member and the end face of the female member, the inwardly directed flange of the nut member have a plurality of threaded through bores spaced apart circumferentially of the flange end and directed toward the flange of the male member. A plurality of screw members are engaged each in a different one of the through bores of the flange of the nut member.

With the male member rigidly connected to one of the pipes to be coupled, and with that pipe being displaced at a small angle relative to the axis of the other pipe, the male member is tilted relative to the female member at a corresponding small angle, this being allowed by the tapered surface of the nose portion of the male member and the relative dimensions of the nose portion of the male member and the sealing surface of the female member. The flange of the male member therefore lies in a general plane which is at an angle relative to the parallel planes of the shoulder and end face of the female member. The nut member is adjusted so that its inwardly directed flange is at least immediately adjacent to the nearest peripheral portion of the flange of the male member. The peripheral portion of the flange which is diametrically opposite the peripheral portion nearest the flange of the nut member is in engagement with the end face of the female member. All of the screw members carried by the flange of the nut member are adjusted to engage the adjacent face of the flange of the male member. The end face of the nose portion of the male member is also tilted and the dimensions of the male and female members are advantageously such that a peripheral portion of the end face of the male member engages the shoulder of the female member.

Though the screw members carried by the flange of the nut member forcibly engage the flange of the male member, thereby holding one peripheral portion of the flange of the nut member in firm engagement with the end face of the female member and also placing the pipe to which the male member is secured in tension, the force thus applied to the male member is axial with respect to the end portion of the pipe to which the male member is secured. There is, therefore, no bending stress applied by the union to the adjacent end portion of the pipe to which the male member is secured. Further, the nut member and its screw members act to hold the male member in such a position that the sealing ring carried by the nose portion of the male member is maintained at all times in a position such that the sealing ring is held in proper sealing engagement with the sealing surface of the female member, and changes in stress on the pipes simply have no effect on the proper sealing action of the union.

IDENTIFICATION OF THE DRAWINGS

FIG. 2 is a view similar to FIG. 1A showing the two pipes coupled according to one embodiment of the invention;

FIG. 3 is a longitudinal cross-sectional view of the union shown in FIG. 1, enlarged for clarity; and FIG. 4 is a cross-sectional view taken generally on line 4—4, FIG. 2.

DETAILED DESCRIPTION OF THE INVENTION

Typical Prior Art

Figures 1, 1A:
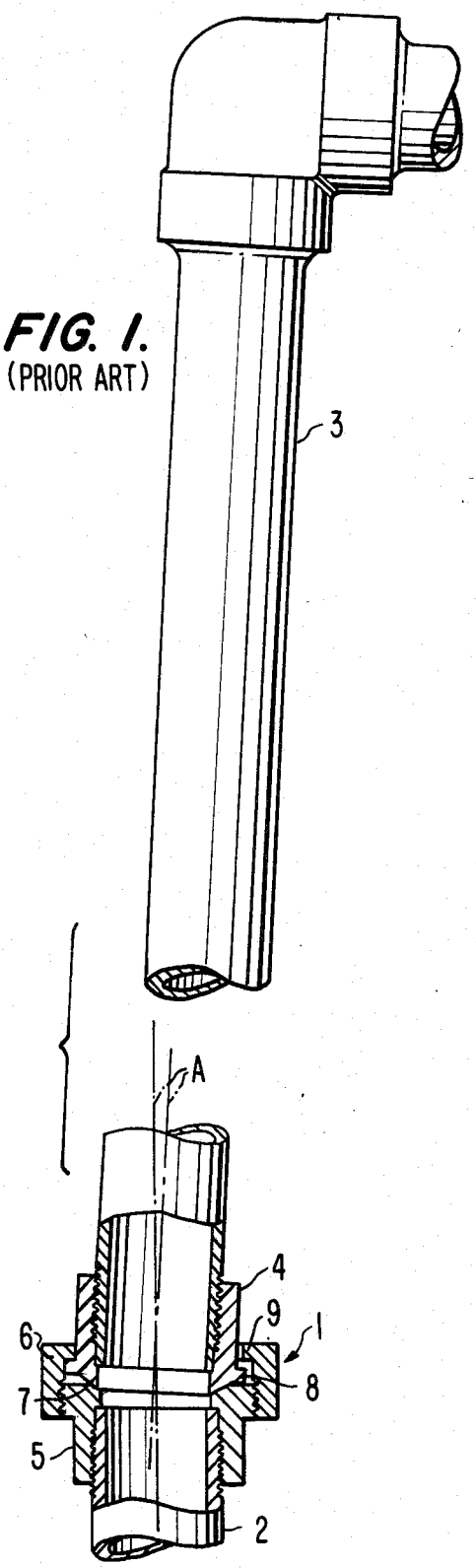
FIG. 1 and 1A are longitudinal cross-sectional views, with some parts shown in elevation, of two pipes coupled by a conventional ground joint union, the bend in one of the pipes being exaggerated for clarity in FIG. 1A.

FIGS. 1 and 1A illustrates a typical conventional ground joint union 1 coupling a first metal pipe 2 to a second metal pipe 3, the upper (as viewed) end of pipe 3 being offset laterally relative to pipe 2 by a distance such that the pipes are misaligned by a small angle A, FIG. 1. The union comprises a male member 4, a female member 5 and a nut member 6. The male and female members have cooperating spherical sealing surfaces at 7. Male member 4 has an outwardly projecting flange 8 cooperating with an inwardly directed annular flange 9 on nut member 6.

FIG. 1 shows the union assembled but not made up, pipe 3 being straight and no bending stress having been established, the spherical sealing surfaces being in offset engagement and not yet in sealing relation. To establish a seal at surfaces 7, nut member 6 is turned relative to member 5 to cause flange 9 to move toward the female member, bringing the parts to the relation shown in FIG. 1A. Tightening of the nut member acts on flange 8 of the male member to swing member 4 counterclockwise (as viewed), typically reducing angle A by 50%. Though this does not bring the spherical sealing surfaces into full engagement, the axis of male member 4 still being angularly displaced relative to the axis of female member 5, tightening the nut does achieve a more complete and more forceful engagement of the sealing surfaces and an adequate seal does result. Counterclockwise (as viewed) movement of male member 4 forces the lower (as viewed) end of pipe 3 to move relative to the other end of that pipe, so that a generally S-shaped curve of pipe 3 (exaggerated in FIG. 1A for clarity) is established. This results in a substantial bending stress in the pipe and that stress, tending to force the pipe back to its original unbent condition, is the main force which prevents fluid under high pressure within the pipes and union from swinging the male member (engaged by the flange of the nut member only at the left hand side as viewed in FIG. 1A) in a counterclockwise direction and thus swinging the spherical surface of member 4 out of sealing engagement with the spherical surface of member 5. Thus, an adequate seal is preserved only so long as the bending stress persists in pipe 3. I have found that there are two things which frequently occur in usage of such unions which cause the bending stress to be relieved, with the result that fluid under high pressure in the pipes and union will then unseat the sealing surfaces. First, one of the pipes may be subjected to a heavy mechanical shock, as by being struck with a tool. Second, a heavy hydraulic shock, internal to the piping system, may occur. In either case, the resulting relief of the bending stress in pipe 3 results in a substantial reduction of the force on the male member tending to preserve the seal, the sealing relationship is lost under the high internal fluid pressure, and the union begins to "spray oil" in the case of a hydraulic piping system.

The Embodiment Of The Invention Shown in FIG. 2–4

In FIG. 2, the two pipes 2 and 3 are shown coupled by a union 20 constructed in accordance with one embodiment of the invention. The union comprises a rigid female member 21, rigidly secured to the end of pipe 2, a rigid male member 22, rigidly secured to the lower (as viewed) end of pipe 3, and a nut member 23.

Female member 21 has a fluid-conducting bore 24 which is coaxial with pipe 2 and terminates at a transverse annular outwardly extending shoulder 25. Extending from shoulder 25 to the end face 26 of the female member is a right circular cylindrical sealing surface 27 of larger diameter than and coaxial with bore 24. The outer surface of member 21 is threaded at 28.

Male member 22 has a fluid-conducting bore 29, a nose portion 30 and a transverse annular outwardly projecting flange 31 located at the end of the nose portion which is nearer pipe 3. The nose portion has a transverse end face 32 which is flat and lies in a place at right angles to the axis of member 22. Nearer to the end face than to the flange is a transverse annular outwardly opening groove accommodating an O-ring 33. Between the groove for O-ring 33 and flange 31, the outer surface portion 34 of the nose portion is frustoconical, tapering at a small angle from a larger diameter at the groove to a smaller diameter at the flange, the angle of taper of portion 34 being slightly greater than the angle of misalignment between pipes 2 and 3 which the union is designed to accommodate. Thus, if the union is to accommodate a pipe misalignment of 4°, the angle of taper of portion 34 can be 5°. The end portion 35 of nose portion 30 extending from the O-ring to end face 32 is so shaped and dimensioned that, when male member 22 is at its maximum allowed angle of tilt, the outer surface of portion 35 is not in interfering engagement with sealing surface 27. Thus, the outer surface of portion 35 can be cylindrical but of smaller diameter that the larger end of surface portion 34. The axial length of nose portion 30 is such that, when any peripheral portion of flange 31 engages end face 26 of the female member, a corresponding peripheral portion of end face 32 of the nose portion will engage shoulder 25 of the female member. Face 36 of flange 31 lies in a frustoconical plane which is at right angles to surface portion 34 of the nose portion. The opposite face 37 of the flange is also frustoconical, tapering at the same angle as does face 36 but in the opposite direction. The outer surface portion 38 of member 22 is right circular cylindrical and concentric with bore 29.

Nut member 23 includes an internally threaded cylindrical ring portion 39 and a transverse annular inwardly directed flange 40, side face 41 of the flange lying in a place at right angles to the axis of the nut member, the annular inner surface 42 of the flange being frustoconical and tapering at the same angle as does portion 34 of the male member but in the opposite direction. The threads of ring portion 39 are engaged with the threads of portion 28 of the female member and the nut member is rotationally adjusted to bring face 41 of flange 40 to a position such that, with male member 22 tilted to the maximum allowable extent relative to the female member, on a radial portion of face 36 of flange 31 engages end face 26 of the female member and the radial portion of face 37 of flange 31 which is diametrically opposite, i.e., to the left as viewed in FIG. 3, engages flange 40 of the nut member at the juncture between that face and surface 42. Flange 40 is provided with a plurality of threaded through bores, and a plurality of screw members 44, typically set screws with cup points, are each engaged in a different one of the through bores. The through bores, and therefore screw members 44, are spaced equally in a circle concentric with the longitudinal axis of the union and slant inwardly toward nose position 30, as shown.

Considering FIG. 2, it will be seen that, with male member 22 of the union tilted to match the angle of displacement of pipe 3 relative to pipe 2 and with flange 31 of member 22 therefor correspondingly tilted, the male member is coaxial with respect to the end of pipe 3 to which the male member is secured. Screw members 44 are adjusted in flange 40 so that each screw member engages face 37 of flange 31 with equal force adequate to tension the pipe but having no significant effect to tilt the male member of the union or to bend the end of pipe 3. The action of screw members 44 does, however, clamp one radial portion of flange 31 of the male member against end face 26 of the female member and holds the corresponding radial portion of end face 32 of nose portion 30 of the male member in engagement with shoulder 25 of the female member. While, because tilted, flange 31 of the male member is supported on the side opposite flange 40 of the nut member only at one radial area, where the flange contacts end face 26, the male member will not swing downwardly (as viewed) because the high pressure of fluid within the pipes and the union resists such movement of the male member. Further, the dimensions and shapes of the parts of the union are such that O-ring 33 will be in proper sealing engagement with surface 27 of the female member for all positions of male member 22 which are possible once screw members 44 have been adjusted in the manner described above. Thus, while less expensive to manufacture than have been the ground joint unions, the union shown in FIGS. 2–4 establishes a good and long-lasting seal between the male and female members of the union without applying any bending stress to pipe 3 and therefore avoids the heretofore unrecognized cause of failure to the prior-art unions.

What is claimed is:

1. In a piping system for handling fluid under relatively high pressure, the combination of
    a first tubular member
        having a longitudinal axis;
    a pipe having a first end and a second end,
        the second end of the pipe being substantially fixed in a position offset from the axis of the first tubular member; and
    a connector coupling the first tubular member to the pipe, the connector comprising
        a female member rigidly secured to said first tubular member and having
            a fluid-conducting bore concentric with the longitudinal axis of the first tubular member and terminating in a transverse annular outwardly extending shoulder which faces away from the first tubular member,
            a right circular cylindrical inner sealing surface which is of larger diameter than the fluid-conducting bore and extends away from said shoulder,
            a transverse annular end face, and
            an outer surface which is threaded adjacent said end face;
        a male member rigidly secured to and coaxial with the first end of the pipe and comprising a fluid-conducting bore of substantially the same diameter as the first bore of the female member, a nose portion dimensioned to be received within the space defined by the sealing surface of the female member and having an end face capable of engagement with said shoulder of the female member, a transverse annular outwardly projecting flange spaced from the end face of the nose portion by a distance such that, when the end face of the nose portion engages said shoulder of the female member, the flange will be at least immediately adjacent to the end face of the female member, and an annular outer surface portion extending from the flange to the end of the male member opposite the nose portion, said nose portion further including a transverse annular outwardly opening groove, a sealing ring seated in said groove, and an outer surface portion extending from the groove to the flange and tapering at a small angle from a larger diameter at the groove to a smaller diameter at the flange, the outer surface portion of the nose portion between the groove and the end face of the nose portion being of such shape and dimensions as not to come into interfering contact with the sealing surface of the first rigid annular member when the male member is tilted at a predetermined small angle relative to the axis of the female member;

a nut member comprising an internally threaded tubular portion in threaded engagement with the externally threaded portion of the female member, and a transverse annular inwardly projecting flange spaced from the end face of the female member, the flange of the male member extending outwardly into the space between the inwardly projecting flange of the nut member and the end face of the female member;

the inwardly projecting flange of the nut member having a plurality of threaded through bores spaced apart circumferentially of the flange and directed toward the flange of the male member; and a plurality of screw members engaged each in a different one of the threaded bores of the flange of the nut member and having their inner ends in engagement with the adjacent face of the flange of the male member;

the male member being tilted relative to the longitudinal axis of the female member at an angle not exceeding said predetermined small angle;

the angle of tilt of the male member and the space between the end face of the female member and the flange of the nut member being such that a first radial portion of the flange of the male member is in engagement with the end face of the female member, a second radial portion of the flange of the male member which is diametrically opposite said first radial portion is in engagement with the flange of the nut member, and a radial portion of the end face of the nose portion of the male member which is axially aligned with said first radial portion of the flange of the male member is in engagement with the shoulder of the female member;

all forces applied to the pipe by the connector being ineffective to stress the pipe in a bending mode to any substantial extent regardless of the fact that the second end of the pipe is laterally offset from the axis of the first tubular member.

2. The combination defined by claim 1, wherein the face of the flange of the male member which is directed toward the end face of the nose portion is frustoconical and at substantially right angles to the tapered outer surface of the nose portion.

3. In a union for coupling a first tubular member to one end of a pipe when the other end of the pipe is offset from the longitudinal axis of the first tubular member, the combination of a rigid female member having a fluid-conducting bore, a transverse annular outwardly projecting shoulder at the end of the bore which is opposite the first tubular member when the female member is secured thereto, and a cylindrical sealing surface extending from said shoulder and coaxial with the bore, the sealing surface terminating at a transverse annular end face of the female member, the body of the female member being externally threaded adjacent said end face; and a rigid male member having a fluid-conducting bore of substantially the same diameter as the bore of the female member, a nose portion dimensioned to be received within the space defined by the sealing surface of the female member and having an end face capable of engagement with said shoulder of the female member, a transverse annular outwardly projecting flange spaced from the end face of the nose portion by a distance such that, when the end face of the nose portion engages said shoulder of the female member, said flange is at least immediately adjacent to the end face of the female member, said nose portion further including a transverse annular outwardly opening groove, a sealing ring seated in said groove, and an outer surface portion extending from the groove to the flange and tapering at a small angle from a larger diameter at the groove to a smaller diameter at the flange, the outer surface portion of the nose portion between the groove and the end face of the nose portion being of such shape and dimensions as not to come into interfering contact with the sealing surface of the female member when the male member is tilted at a predetermined small angle relative to the axis of the female member;

a nut member comprising an internally threaded ring portion in threaded engagement with the externally threaded portion of the female member, and a transverse annular inwardly projecting flange spaced from the end face of the female member, the flange of the male member extending outwardly into the space between the flange of the nut member and the end face of the female member, the inwardly projecting flange of the nut member having a plurality of threaded through bores spaced apart circumferentially of the flange and directed toward the flange of the male member; and a plurality of screw members engaged each in a different one of the threaded bores of the flange of the nut member and having their ends in engagement with the adjacent face of the flange of the male member;

the male member being tilted relative to the longitudinal axis of the female member at an angle not exceeding said predetermined angle, the angle of tilt of the male member and the space between the end face of the female member and the flange of the nut member being such that a first radial portion of the flange of the male member is in engagement with the end face of the female member, a second radial portion of the flange of the male member which is diametrically opposite said first radial portion is in engagement with the flange of the nut member, and a radial portion of the end face of the nose portion is in engagement with the shoulder of the female member.

* * * * *